(12) United States Patent
Xu

(10) Patent No.: US 11,656,703 B2
(45) Date of Patent: May 23, 2023

(54) TOUCH MODULE, TOUCH DISPLAY SCREEN, AND TOUCH DISPLAY DEVICE

(71) Applicants: Hefei Xinsheng Optoelectronics Technology Co., Ltd., Anhui (CN); BOE Technology Group Co., Ltd., Beijing (CN)

(72) Inventor: Jiawei Xu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/406,539

(22) Filed: Aug. 19, 2021

(65) Prior Publication Data

US 2022/0083162 A1 Mar. 17, 2022

(30) Foreign Application Priority Data

Sep. 16, 2020 (CN) .......................... 202022038288.5

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04107* (2013.01)

(58) Field of Classification Search
CPC ................. G06F 3/0412; G06F 3/0446; G06F 2203/04107
See application file for complete search history.

(56) References Cited

U.S. PATENT DOCUMENTS

| | | | |
|---|---|---|---|
| 10,620,730 B2* | 4/2020 | Yoshida ................... G06F 3/044 |
| 11,429,235 B2* | 8/2022 | Kim ..................... H01L 27/3276 |
| 11,449,163 B2* | 9/2022 | Park ........................ G06F 3/0448 |
| 2018/0239476 A1* | 8/2018 | Yoshida ................ H01L 27/124 |
| 2020/0089343 A1* | 3/2020 | Kadowaki ............. G06F 3/0442 |
| 2021/0209616 A1* | 7/2021 | Bastide .............. G06Q 30/0201 |
| 2021/0255731 A1* | 8/2021 | Kim ....................... G06F 3/0446 |

* cited by examiner

*Primary Examiner* — Peter D McLoone
(74) *Attorney, Agent, or Firm* — IPro, PLLC

(57) ABSTRACT

The disclosure relates to the technical field of displays, and discloses touch module, touch display screen, and touch display device. The touch module includes touch region, peripheral region, and bonding region. The peripheral region includes: connection traces, which include first trace and second trace that are disposed at interval; a shielding wire disposed between the first trace and the second trace, wherein a side wall of the shielding wire close to the first trace is a first side wall, a side wall of the shielding wire close to the second trace is a second side wall, a side wall of the first trace close to the shielding wire is a third side wall, a side wall of the second trace close to the shielding wire is a fourth side wall, and a grounding wire disposed at sides of the connection traces away from the touch region.

18 Claims, 7 Drawing Sheets

TOUCH MODULE, TOUCH DISPLAY SCREEN, AND TOUCH DISPLAY DEVICE

The disclosure claims the priority of a Chinese patent application filed in the China National Intellectual Property Administration on Sep. 16, 2020 with application number 202022038288.5 and application name "Touch Module, Touch Display Screen, and Touch Display Device", the entire contents of which are hereby incorporated by reference.

TECHNICAL FIELD

The present disclosure relates to the technical field of display, and in particular, relates to a touch module, a touch display screen, and a display device.

BACKGROUND

As the display technology evolves, touch display devices such as smart phones and tablet computers have been widely applied. The touch display device includes a touch display screen, which has a touch module. The touch module includes a touch region and a peripheral region that is provided with a plurality of traces therein. The traces are usually made of an APC material (a silver alloy material mainly containing silver, palladium and copper). Ionization and migration (silver migration) may occur to the APC material, and a silver migration rate of the APC material is not only correlated with its components, but also positively correlated with the magnitude of a voltage between two traces and negatively correlated with a space between the two traces. That is, the higher the voltage between the two traces, the higher the silver migration rate; and the smaller the space, the higher the silver migration rate.

SUMMARY

Embodiments of the present disclosure provide a touch module, a touch display screen and a touch display device.

In one aspect, an embodiment of the present disclosure provides a touch module, which comprises a touch region, a peripheral region, and a bonding region. The peripheral region includes a plurality of traces. The traces include: connection traces, which are configured to electrically connect the touch region with the bonding region, and include a first trace and a second trace that are disposed at interval, a shielding wire disposed between the first trace and the second trace, wherein a side wall of the shielding wire close to the first trace is a first side wall, a side wall of the shielding wire close to the second trace is a second side wall, a side wall of the first trace close to the shielding wire is a third side wall, a side wall of the second trace close to the shielding wire is a fourth side wall, the first side wall and the third side wall are evenly and equally spaced therebetween, and the second side wall and the fourth side wall are evenly and equally spaced therebetween; and a grounding wire disposed at sides of the connection traces away from the touch region.

Optionally, the traces comprise a first corner, at which the fourth side wall comprises a first extension segment and a second extension segment that is disposed at an obtuse angle with respect to the first extension segment.

Optionally, the second extension segment inclines towards a side close to the shielding wire, and one end of the shielding wire extends beyond an end of the first extension segment close to the second extension segment, an end of the shielding wire is provided with an avoidance chamfer on a side close to the second extension segment, a side wall of the avoidance chamfer close to the second extension segment is a first side sub-wall which is in parallel with the second extension segment, and a distance between the first side sub-wall and the second extension segment is equal to a distance between the second side wall and the first extension segment.

Optionally, the traces comprise a first corner, at which the fourth side wall comprises a first extension segment and a second extension segment that is disposed at an obtuse angle with respect to the first extension segment, and the second extension segment inclines towards a side close to the shielding wire; and one end of the shielding wire is flush with an end of the first extension segment close to the second extension segment.

Optionally, the traces comprise a second corner, at which:
the third side wall comprises a plurality of third side wall subsegments, the first side wall comprises a plurality of first side wall segments in parallel with the third side wall subsegments in one-to-one correspondence, and a space between any corresponding pair of the third side wall subsegment and the first side wall segment is equal; and the fourth side wall comprises a plurality of fourth side wall subsegments, the second side wall comprises a plurality of second side wall segments in parallel with the fourth side wall subsegments in one-to-one correspondence, and a space between any corresponding pair of the fourth side wall subsegment and the second side wall segment is equal.

Optionally, the traces comprise a third corner, at which corresponding portions of the first side wall and the third side wall are arc-shaped with the same curvature, and corresponding portions of the second side wall and the fourth side wall are arc-shaped with the same curvature.

Optionally, a side wall of the grounding wire close to the second trace and a side wall of the second trace close to the grounding wire are evenly and equally spaced therebetween.

Optionally, the traces are made of an APC material.

Optionally, the touch module comprises a substrate, a pattern layer and an insulating protective layer in a laminated arrangement:

the pattern layer disposed at one side of the substrate, wherein the traces are disposed within the pattern layer; and the insulating protective layer disposed on a side of the pattern layer away from the substrate.

In another aspect, the present disclosure further provides a touch display screen, which includes a display module and the aforesaid touch module in a laminated arrangement.

In the touch display screen according to an embodiment of the present disclosure, the aforesaid touch module is used. Based on the same reason as that regarding the aforesaid touch module, the reliability of the touch display screen may be improved.

In another aspect, the present disclosure further provides a touch display device, which includes the aforesaid touch display screen.

In the touch display device according to an embodiment of the present disclosure, the aforesaid touch display screen is used. Based on the same reason as that regarding the aforesaid touch display screen, the reliability of the touch display device may be improved.

DETAILED DESCRIPTION

Figure 1:
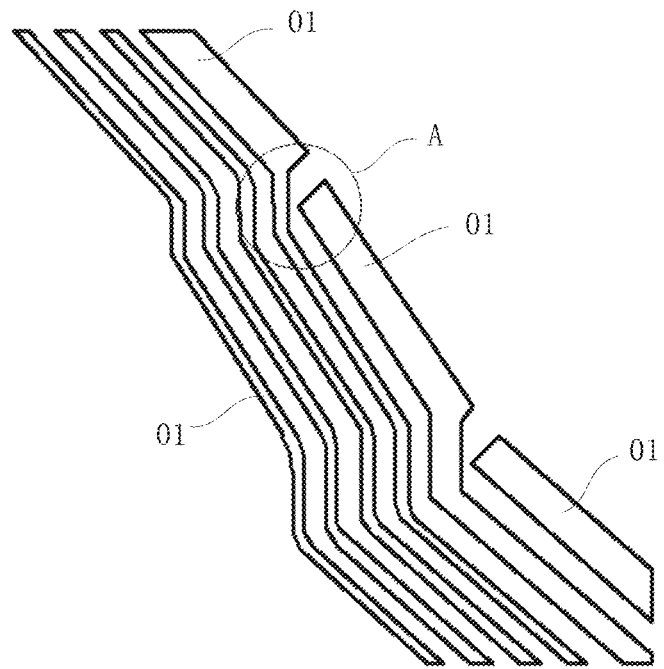
FIG. 1 is a schematic diagram of a trace structure of a peripheral region of a touch module provided in the prior art.

The technical solutions in the embodiments of the present application will be clearly and completely described below with reference to the drawings in the embodiments of the present application. Obviously, the embodiments as described are merely some rather than all of the embodiments of the present application. Based on the embodiments in the present application, all other embodiments obtained by a person of ordinary skills in the art without making creative efforts shall fall within the protection scope of the present application.

In the description of the present application, it should be understood that the terms such as "up", "down", "left", "right", and "horizontal" indicate directions or positional relations based on the directions or position relations as shown in the accompanying drawings only for the purposes of describing the present application and simplifying the description, instead of indicating or implying that a mentioned device or element must have a specific direction or must be constructed and operated in a specific direction. Therefore, these terms should not be construed as limiting the present application.

In addition, the terms "first" and "second" are used for descriptive purposes only, and should not be construed as indicating or implying relative importance or implicitly indicating the number of technical features indicated. As such, the features defined by "first" and "second" may explicitly or implicitly include one or more of said features. In the description of the present application, unless otherwise specified, "a plurality of" means two or more.

A display device is a device or apparatus for displaying electronic information in a visualized manner, where the touch display device is a display device that may be operated and controlled by tapping a screen with a finger (which may also be a stylus or other tools), and the touch display device at least includes one touch display screen (also referred to as a touch display panel, a touch panel, a touch screen or the like). As an example, the touch display device may be any product or component with a display function, for example, a smart phone, a tablet computer, a television, a display, a notebook computer, and other wearable electronic apparatuses (for example, a watch).

The touch display screen includes a display module and a touch module in a laminated arrangement, where the display module includes a display region and a non-display region; and the touch module includes a touch region and a peripheral region. In some embodiments, when the display module and the touch module are assembled or integrated, the touch region of the touch module corresponds to the display region of the display module, and the peripheral region of the touch module corresponds to the non-display region. Based on the method for assembling the touch module and the display module, the touch display screens may be classified into: an add-on mode touch panel with the touch module attached to a surface of the display module, and an in-cell (embedded) mode touch panel with the touch module integrated on the display module. The touch display screen may be a flexible screen or a foldable screen or a rigid screen, or may be a curved screen or a non-curved screen, which is not specifically limited in the present application.

Referring to FIG. 1, there is illustrated a schematic diagram of a trace structure of a touch module provided in the related art, where a peripheral region includes a plurality of traces 01 disposed at interval, and corners (turnings or bends) exist in extension paths of the traces 01.

Figure 2:
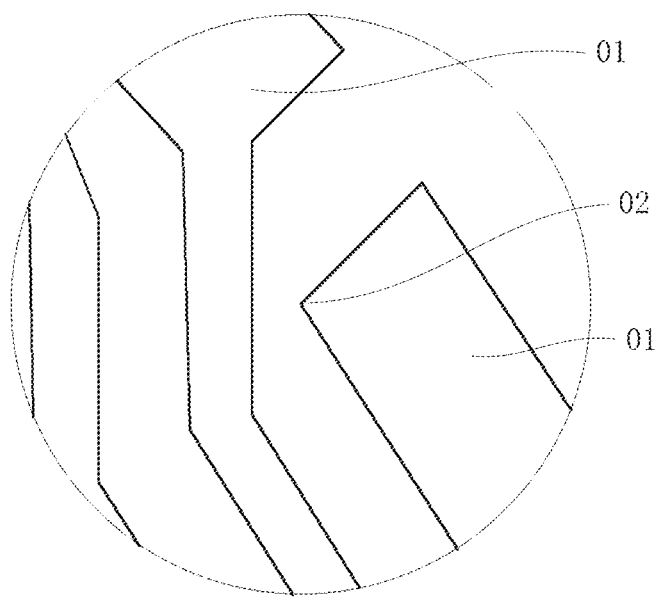
FIG. 2 is a partially enlarged view of A in FIG. 1.

Referring to FIG. 2, at some corners, one of two adjacent traces 01 is provided with a protrusion (a tip) 02 allowing the two traces 01 to get too close (compared with other positions on the two traces 01).

Figure 3:
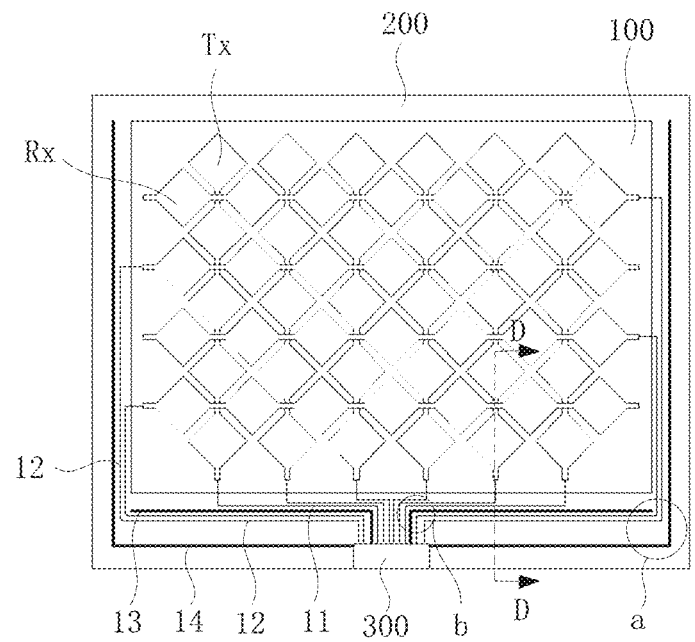
FIG. 3 is a schematic structural diagram of a touch module according to an embodiment of the present application.

Referring to FIG. 3, the touch module further includes a bonding region 300 (also referred to as a bond-pad region in other places) disposed at one side of the peripheral region 200. The bonding region 300 is configured to connect an IC (a chip). Here, the peripheral region 200 refers to all the region surrounding the touch region 100, and the bonding region 300 is a partially specified region of the peripheral region 200. In some embodiments, referring to FIG. 3 and FIG. 4, the peripheral region 200 includes a plurality of traces that are disposed at interval. Specifically, the traces include connection traces configured to connect the touch region 100 with the bonding region 300; the connection traces include a first trace 11 and a second trace 12 that are disposed at interval; the first trace 11 and the second trace 12 are partially disposed oppositely. As an example, referring to FIG. 3, extension segments of the first and second traces 11 and 12 on an underside of the touch region 100 are disposed oppositely; and on the underside of the touch region 100, the second trace 12 is disposed on a side of the first trace 11 away from the touch region 100. The traces further include a shielding wire 13 disposed between the first trace 11 and the second trace 12, and a grounding wire 14 disposed on a side of the second trace 12 away from the touch region 100. Here, the shielding wire 13 is only disposed on a portion at which the first trace 11 and the second trace 12 are disposed oppositely; the shielding wire 13 is configured to prevent the generation of signal interferences between the first trace 11 and the second trace 12; and the grounding wire 14 is configured to shield external electromagnetic signals to reduce the interferences of the external signals to the signals of the connection traces.

Figure 7:
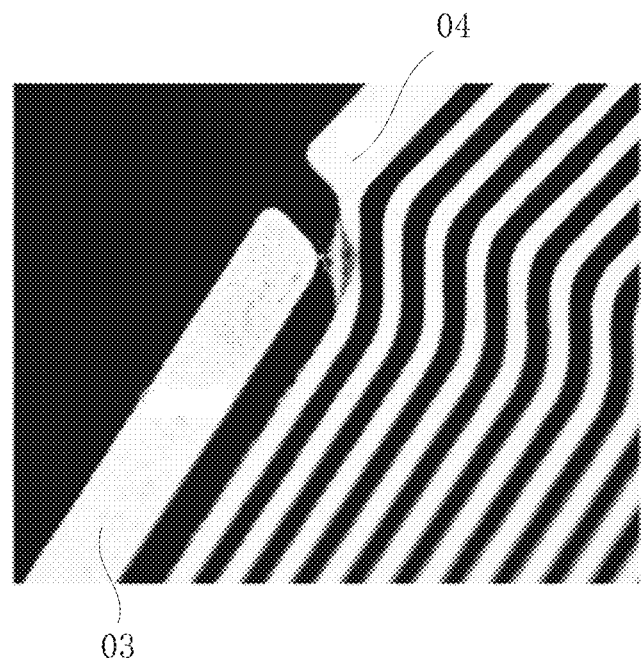
FIG. 7 is a scanning electron micrograph showing silver migration occurring at a trace corner of a touch module in the prior art.

At present, one of the important development trends of the touch display device involves a full screen and a narrow bezel. To reduce the width of a bezel (i.e., the non-display region) of the touch display screen as much as possible, it is necessary to reduce the width of the peripheral region of the display module and meanwhile to reduce the width of the peripheral region of the touch module corresponding to the display module. In general, the purpose of reducing the width of the peripheral region is usually achieved by reducing the widths of the traces (respective wires) per se and reducing the size of the space between any two adjacent traces. Along with the development of the narrow-bezel trend of the touch display screen, the problem of dependent silver migration occurring between the traces of the touch module becomes more and more serious. As an example, referring to FIG. 7, there is illustrated a scanning electron micrograph of dependent silver migration occurred between the shielding wire and the first trace in a touch module provided in the prior art.

A theoretical formula of silver migration is as follows:

$$t50 = \left(\alpha \frac{D^m}{H^x U^n}\right) \exp(\Delta H/kT).$$

Here, $t_{50}$ represents a median life (a time required by 50% of cumulative failures); a represents a proportional constant; U represents an applied voltage; D represents a space between two electrodes, H represents a humidity factor; AH represents an activation energy (eV) required by silver migration; k represents a Boltzmann constant (8.617×10-5 eV/K); and T represents an absolute temperature (K). Based on literature review, the activation energy during the process of electrochemical silver migration is determined as 1.15±0.15 eV. Here, m, n and x represent coefficients of test indexes determined by the touch display screen.

As may be known from the formula above, a speed (probability) at which the silver migration occurs between the traces is not only correlated with the performances of the traces, but also positively correlated with the magnitude of a voltage between two traces and negatively correlated with a space between the two traces. That is, the higher the voltage between the two traces, the higher the silver migration rate; and the smaller the space between the two traces, the higher the silver migration rate. Therefore, during the process of implementing a narrow bezel, reducing the space between the traces will increase the probability of differential silver migration between the traces.

Based on studies, the inventor has the following findings.

Figure 5:
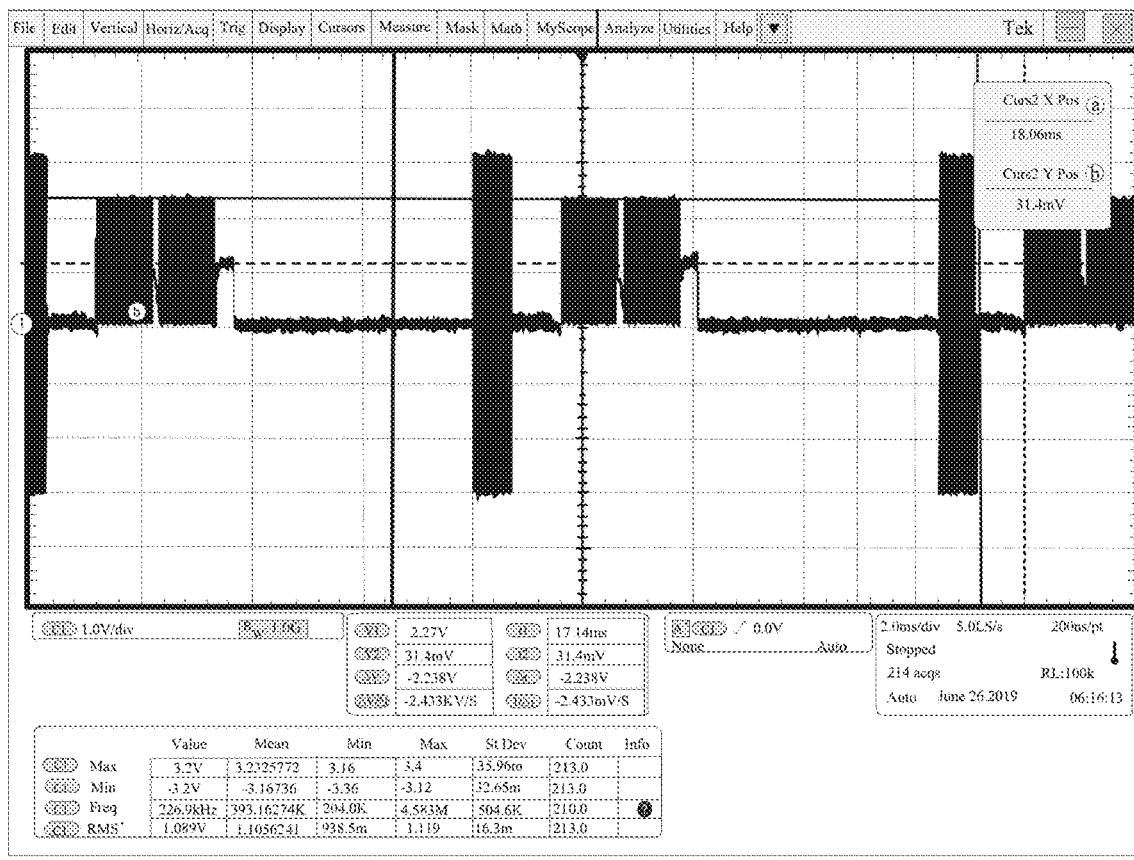
FIG. 5 shows voltage signal waves between a shielding wire and a first trace as displayed by an oscilloscope.

In one aspect, referring to FIG. 5, it illustrates, by means of an oscilloscope, a voltage difference between the first trace 11 (for example, it may be a Tx-electrode connection trace connecting a touch drive electrode Tx with the bonding region) and the shielding wire 13 when the touch module works. As may be seen from the illustration in FIG. 5, a voltage difference between the first trace 11 and the shielding wire 13 is 3.2 V (volt) at most, and a voltage signal cycle is 120 HZ (hertz). It should be understood that the specific values of a peak of the aforesaid voltage difference and a voltage signal frequency may be different depending on the technical parameters of the touch module. FIG. 5 shows only one of the graphs selected by the inventor from numerous experimental data. As may be seen from FIG. 5, when the touch module works, the voltage difference exists between the first trace 11 and the shielding wire 13.

Figure 6:
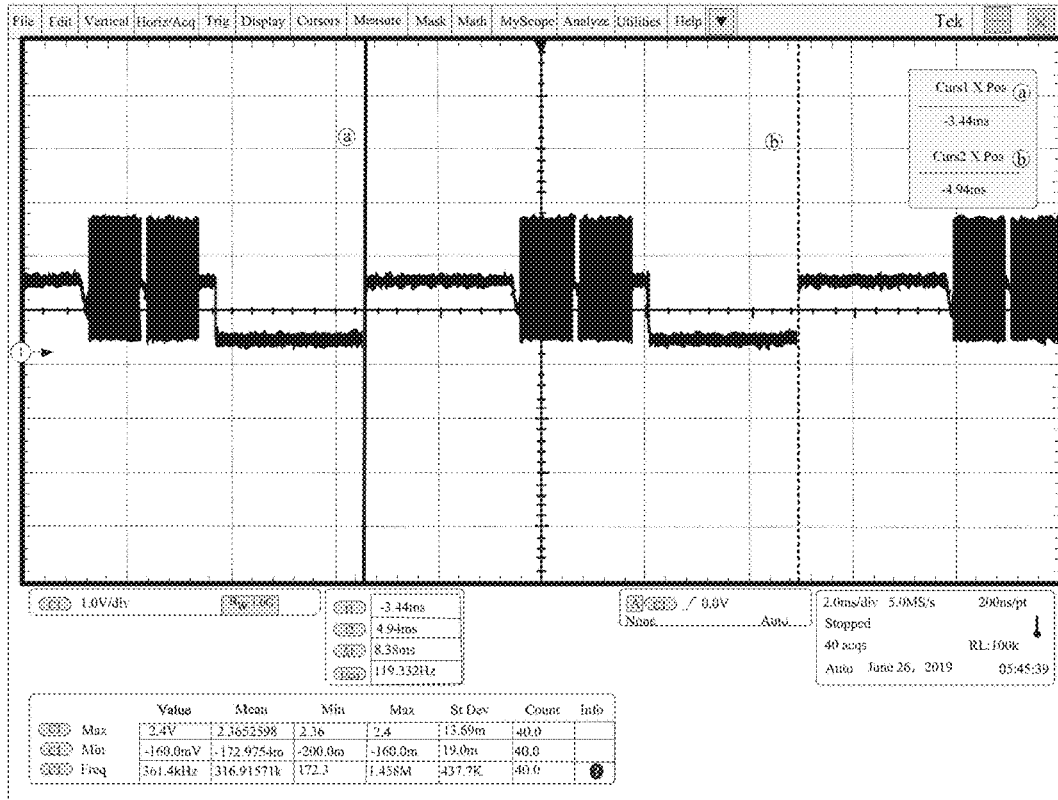
FIG. 6 shows voltage signal waves between a shielding wire and a second trace as displayed by the oscilloscope.

In another aspect, referring to FIG. 6, it illustrates, by means of the oscilloscope, a voltage difference between the second trace 12 (for example, it may be an Rx-electrode connection trace connecting a touch detection electrode Rx with the bonding region) and the shielding wire 13 when the touch module works. As may be seen from the illustration in FIG. 6, the voltage difference between the second trace 12 and the shielding wire 13 is 2.4 V (volt) at most, and a voltage signal cycle is 120 HZ. It should be understood that the specific values of the aforesaid voltage difference and signal frequency may be different depending on the technical parameters of the touch module. FIG. 6 is only one of the graphs selected by the inventor from numerous experimental data. As may be seen from FIG. 6, when the touch module works, the voltage difference exists between the second trace 12 and the shielding wire 13.

Figure 4:
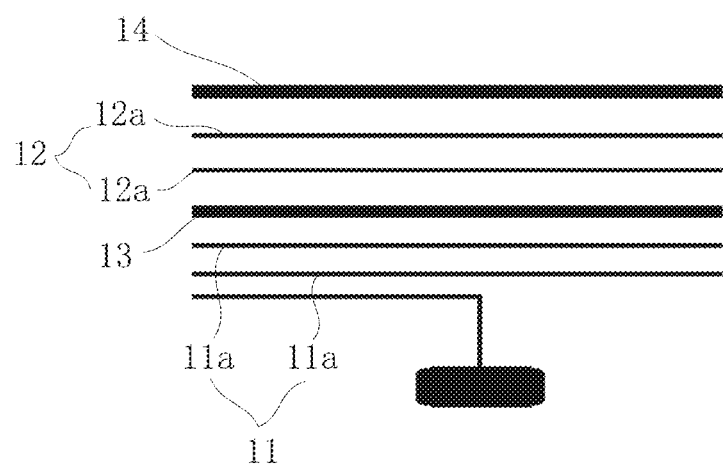
FIG. 4 is a schematic diagram of a trace arrangement of a peripheral region of a touch module according to an embodiment of the present application.

In another aspect, referring to FIG. 4, the first trace 11 includes a plurality of first sub-traces 11a disposed at interval; the second trace 12 includes a plurality of second sub-traces 12a disposed at interval; and no or very small voltage difference exists between two adjacent first sub-traces 11a and between two adjacent second sub-traces 12a.

In summary, the inventor found from the aforesaid studies and analysis that: the problem of dependent silver migration on the traces occurred frequently between the shielding wire 13 and the connection traces, i.e., between the shielding wire 13 and the first trace 11 and between the shielding wire 13 and the second trace 12; and in particular, this problem occurred frequently at the positions of corners of the traces (i.e., the shielding wire 13 and the connection traces). The reasons why the silver migration easily occurs at the corner regions of the current touch modules have been described in the background art section, the details which will not be repeated here anymore. As an example, referring FIG. 7, there is illustrated a scanning electron micrograph of the silver migration occurring at a corner in a peripheral region of a current touch module, where at the corner of the traces, specifically at a protrusion at which a shielding wire 03 and connection traces 04 are close to each other, the silver migration occurring to the connection traces 04 is more serious than those occurring at the rest of the positions, which easily leads to disconnections of the connection traces 04 at the corners of the traces, affecting the reliability of the touch module.

An embodiment of the present disclosure provides a touch module. Referring to FIG. 3, the touch module includes a touch region 100, a peripheral region 200, and a bonding region 300. Referring to FIG. 3 and FIG. 4, the peripheral region 200 includes a plurality of traces. The traces include: connection traces, which are configured to electrically connect the touch region 100 with the bonding region 300, and include a first trace 11 and a second trace 12 that are disposed at interval; a shielding wire 13 disposed between the first trace 11 and the second trace 12, where, referring to FIG. 8, a side wall of the shielding wire 13 close to the first trace 11 is a first side wall 21, a side wall of the shielding wire 13 close to the second trace 12 is a second side wall 22, a side wall of the first trace 11 close to the shielding wire 13 is a third side wall 23, a side wall of the second trace 12 close to the shielding wire 13 is a fourth side wall 24, the first side wall 21 and the third side wall 23 are evenly and equally spaced therebetween, and the second side wall 22 and the fourth side wall 24 are evenly and equally spaced therebetween; and a grounding wire 14 disposed at sides of the connection traces away from the touch region 100. Here, referring to FIG. 3, extension segments of the first and second traces 11 and 12 on an underside of the touch region 100 are disposed oppositely; and on the underside of the touch region 100, the second trace 12 is disposed on a side of the first trace 11 away from the touch region 100. The so-called "evenly and equally spaced therebetween" means approximately parallel to each other, which means the first wall 21 is approximately parallel to the third wall 23; the second wall 22 is approximately parallel to the fourth wall 24.

Figure 8:
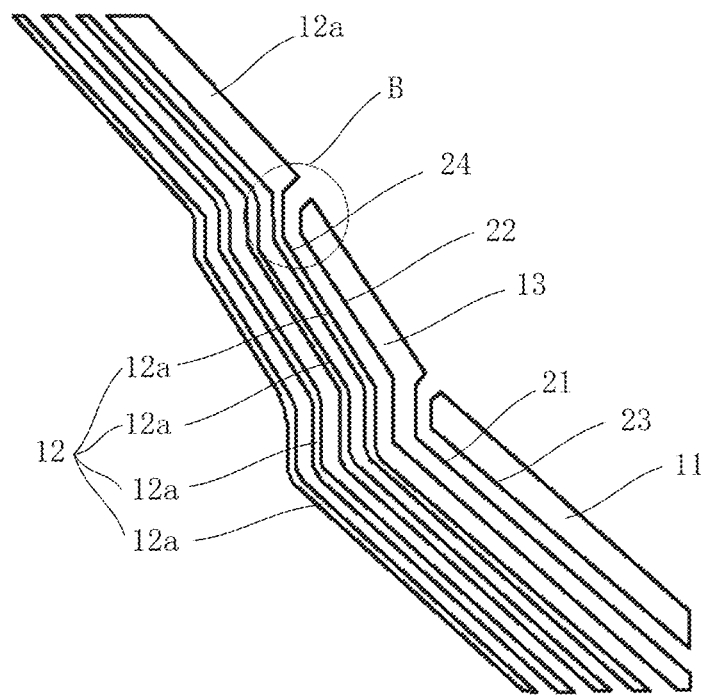
FIG. 8 is a schematic diagram of a trace structure of a peripheral region of a touch module according to Embodiment 1 of the present application.

In the touch module according to the embodiment of the present application, referring to FIG. 8, the shielding wire 13 is disposed between the first trace 11 and the second trace 12, and the first side wall 21 and the third side 23 wall are evenly and equally spaced therebetween, such that a space formed between the shielding wire 13 and the first trace 11 are equal in width at any position in extension paths of the traces, thereby preventing the shielding wire 13 and the first trace 11 from forming therebetween a protrusion that allows the two to get too close to each other. As a result, an area with an undersized distance may be prevented from being formed between the shielding wire 13 and the first trace 11; charges may be prevented from being accumulated at a certain position of the shielding wire 13 and the first trace 11; a position with an oversized voltage difference may be prevented from being formed between the shielding wire 13 and the first trace 11; and the risk of silver migration may be reduced between the first side wall 21 and the third side wall 23. That is, the risk of silver migration may be reduced between the shielding wire 13 and the first trace 11. Similarly, the second side wall 22 and the fourth side wall 24 are evenly and equally spaced therebetween, such that the risk of silver migration may be reduced between the shielding wire 13 and the second trace 12. Compared with the prior art where a protrusion allowing two adjacent traces to get too close exists at a corner position, in the present application, the shielding wire 13 and the first trace 11 are evenly and equally spaced therebetween, and the shielding wire 13 and the second trace 12 are evenly and equally spaced therebetween, which may effectively reduce the risk of silver migration occurring between the shielding wire 13 and the first trace 11 as well as between the shielding wire 13 and the second trace 12. As a result, the problem of silver migration that is likely to occur at the corner of the traces is solved, and the reliability of the display module is improved.

It should be noted that the touch region refers to a region which is configured to form touch electrodes and may generate electric signals to detect a touch position. As an example, the touch module may be of a mutual capacitance type. Referring to FIG. 3, the touch region includes a plurality of touch drive electrodes Tx and a plurality of touch detection electrodes Rx, both of which are mutually crossed and insulated from each other. Here, the first trace 11 may be a Tx-electrode connection trace for connecting the touch drive electrodes Tx with the bonding region; and the second trace 12 may be an Rx-electrode connection trace for connecting the touch detection electrodes Rx with the bonding region. The bonding region 300 includes a plurality of wiring terminals, and ends of the plurality of traces are connected to the plurality of wiring terminals in one-to-one correspondence.

As an example, referring to FIG. 3, the bonding region 300 is disposed at an edge position of the peripheral region 200 on an underside of the touch region 100; and the second trace 12 and the grounding wire 14 are only disposed inside the peripheral region 200 on the left and right of the touch region 100. Since there is no first trace 11, it is unnecessary to dispose the shielding wire 13. Inside the peripheral region 200 on the underside of the touch region 100, the first trace 11, the shielding wire 13, the second trace 12 and the grounding wire 14 are disposed in sequence along a direction from top to bottom.

Figure 9:
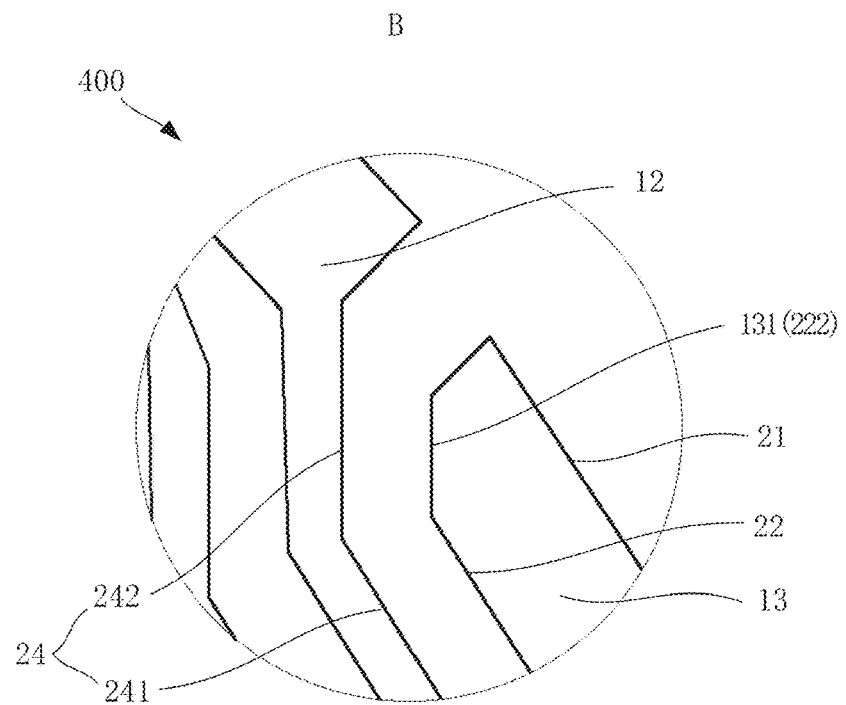
FIG. 9 is a partially enlarged view of B in FIG. 8.

In some embodiments, referring to FIG. 8 and FIG. 9, the traces include a first corner 400, at which the fourth side wall 24 includes a first extension segment 241 and a second extension segment 242 that is disposed at an obtuse angle with respect to the first extension segment 241. The second extension segment 242 inclines towards a side close to the shielding wire 13. The first corner 400 is formed by bending the second trace 12 towards a side close to the shielding wire 13. Compared with the case where a right-angle corner is used, the first corner 400 which is an obtuse-angle corner in this embodiment may reduce the possibility of forming a tip by the trace at the corner position, thereby reducing the possibility of forming the protrusion allowing the second side wall 22 and the fourth side wall 24 to get close to each other, and further reducing the problem of silver migration occurred between the second trace 12 and the shielding wire 13. As an example, the first corner 400 may be a corner existing at a in FIG. 3.

Referring to FIG. 8 and FIG. 9, one end of the shielding wire 13 extends beyond an end (a turning point of the first corner 400) of the first extension segment 241 close to the second extension segment 242; an end of the shielding wire 13 is provided with an avoidance chamfer 131 on a side close to the second extension segment 242; a side wall of the avoidance chamfer 131 close to the second extension segment 242 is a second side sub-wall 222; the second side sub-wall 222 is in parallel with the second extension segment 242; and a distance between the second side sub-wall 222 and the second extension segment 242 is equal to a distance between the second side wall 22 and the first extension segment 241.

In this embodiment, one end of the shielding wire 13 extends to the first corner 400 and extends beyond the turning point (a position at which the first extension segment 241 is connected with the second extension segment 242) of the first corner 400 by a certain length. By providing the avoidance chamfer 131 on the end of the shielding wire 13 at the side close to the second trace 12, an apical angle of the shielding 13 is prevented from forming a protrusion that is too close to the second extension segment 242. That is, at the first corner 400, the width of the shielding wire 13 is adjusted in such a way that the shielding wire 13 forms the second side sub-wall 222 in parallel with the second extension segment 242, allowing the second side wall 22 and the fourth side wall 24 to be evenly and equally spaced therebetween.

It should be understood that the second side sub-wall 222 is a part of the second side wall 22. The traces are usually prepared and formed by evaporation. Therefore, the "avoidance chamfer 131" is merely the description of a structure of the shielding wire 13, instead of indicating preparing this structure by "chamfering". The avoidance chamfer 131 is directly prepared into a desired structure (shape) during designing and manufacturing.

Figure 10:
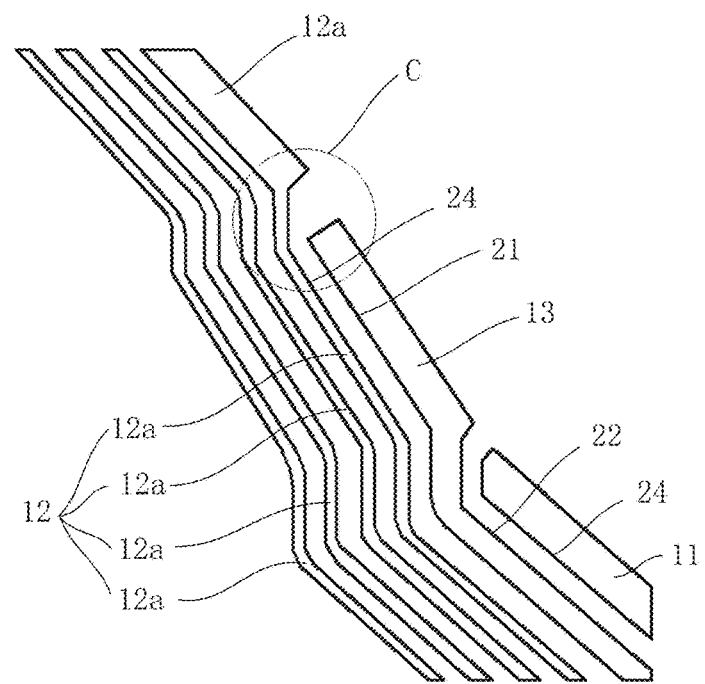
FIG. 10 is a schematic diagram of a trace structure of a peripheral region of a touch module according to Embodiment 2 of the present application.
Figure 11:
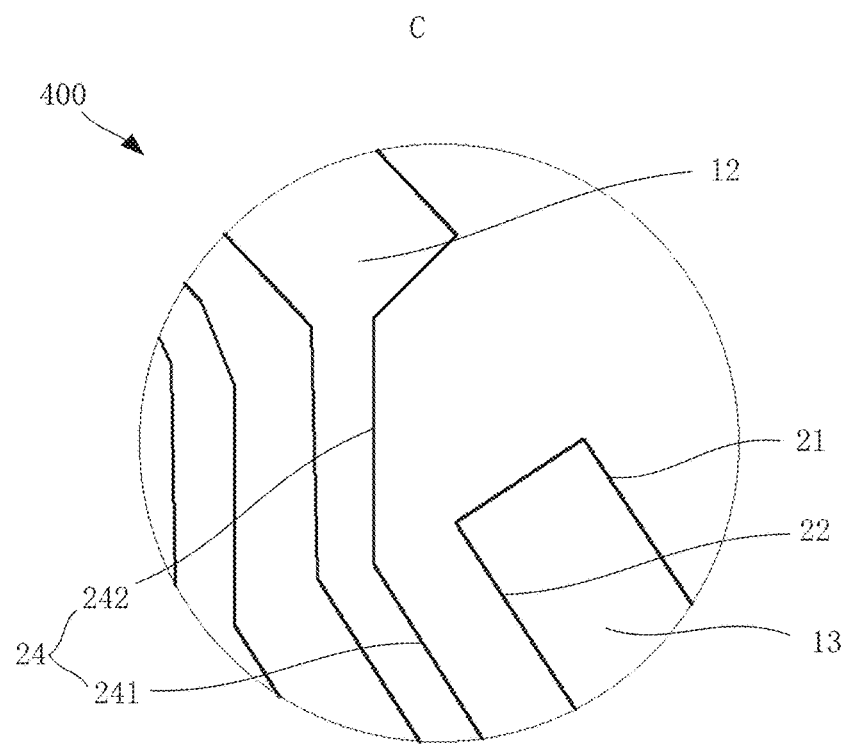
FIG. 11 is a partially enlarged view of C in FIG. 10.

Referring to FIG. 10 and FIG. 11, one end of the shielding wire 13 is flush with an end (i.e., a turning point of the corner 400) of the first extension segment 241 close to the second extension segment 242. That is, the end of the shielding wire 13 extends to the turning point of the first corner 400, thereby preventing the second side wall 22 of the shielding wire 13 from forming a protrusion that is too close to the second extension segment 242.

Compared with the foregoing embodiment, in this embodiment, the width of the shielding wire 13 is the same along an extension direction of the shielding wire 13 at the first corner 400; and the apical angle of the shielding wire 13 is prevented from getting close to the second extension segment by reducing the length of the shielding wire 13.

It should be understood that, in general, the extension length of the shielding wire 13 is longer than that of the first trace 11, that is, the end of the shielding wire 13 extends beyond the end of the first trace 11 by a distance; and the end of the first trace 11 extends to a side of the turning point of the first corner 400 away from the second extension segment 242. Therefore, at the first corner 400, reducing the length of the shielding wire 13 in a small range will not affect the function of the shielding wire 13 for shielding interference signals between the first trace 11 and the second trace 12.

The first corner 400 may also be present between the first side wall 21 of the shielding wire 13 and the third side wall 23 of the first trace 11. When a first corner is present between the first trace 11 and the shielding wire 13, a structure between the first trace 11 and the shielding wire 13 is similar to that between the shielding wire 13 and the second trace 12, the details of which will not be repeated here anymore.

Figure 12:
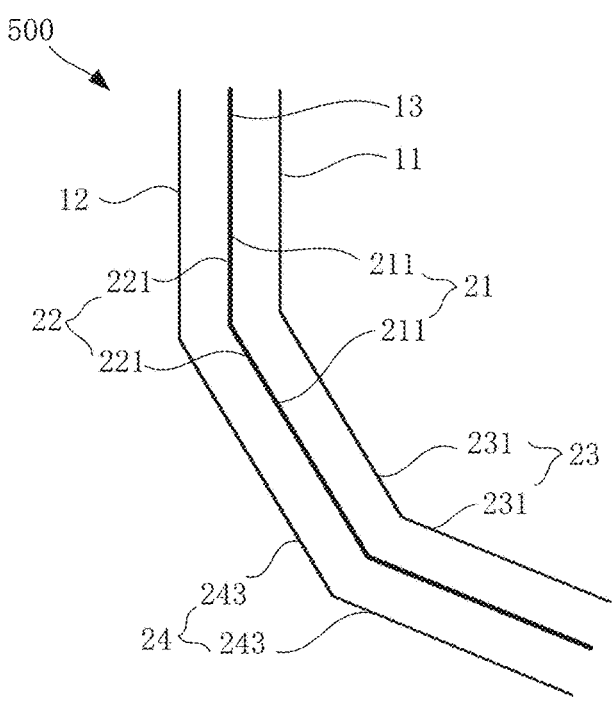
FIG. 12 is a schematic diagram of a trace structure at a second corner of a touch module according to an embodiment of the present application.

In some embodiments, the traces include a second corner 500. Referring to FIG. 12, at the second corner 500, the third side wall 23 includes a plurality of third side wall subsegments 231; the first side wall 21 includes a plurality of first side wall subsegments 211 in parallel with the third side wall subsegments 231 in one-to-one correspondence; and a space between any corresponding pair of the third side wall subsegment 231 and the first side wall subsegment 211 is equal, such that the first side wall 21 and the third side wall 23 are evenly and equally spaced at the second corner 500. As an example, the number of the third side wall subsegments 231 and the number of the first side wall subsegments 211 are both three, and any two adjacent third side wall subsegments 231 are disposed in an obtuse angle. The second corner 500 does not specifically refer to a certain corner, but may be any corner that may be present at any oppositely disposed portions of the first and second traces 11 and 12. As an example, the second corner 500 may be a corner present at b in FIG. 3.

The fourth side wall 24 includes a plurality of fourth side wall subsegments 243; the second side wall 22 includes a plurality of second side wall subsegments 221 in parallel with the fourth side wall subsegments 243 in one-to-one correspondence; and a space between any corresponding pair of the fourth side wall subsegment 243 and the second side wall subsegment 221 is equal, such that the second side wall 22 and the fourth side wall 24 are evenly and equally spaced at the second corner 500.

At the second corner 500, the first side wall 21 and the third side wall 23 are configured into a structure with a plurality of segments that run in the same direction and are equally spaced, such that the first side wall 21 and the third side wall 23 are evenly and equally spaced therebetween; and the second side wall 22 and the fourth side wall 24 are configured into a structure with a plurality of segments that run in the same direction and are equally spaced, such that the second side wall 22 and the fourth side wall 24 are evenly and equally spaced therebetween.

Figure 13:
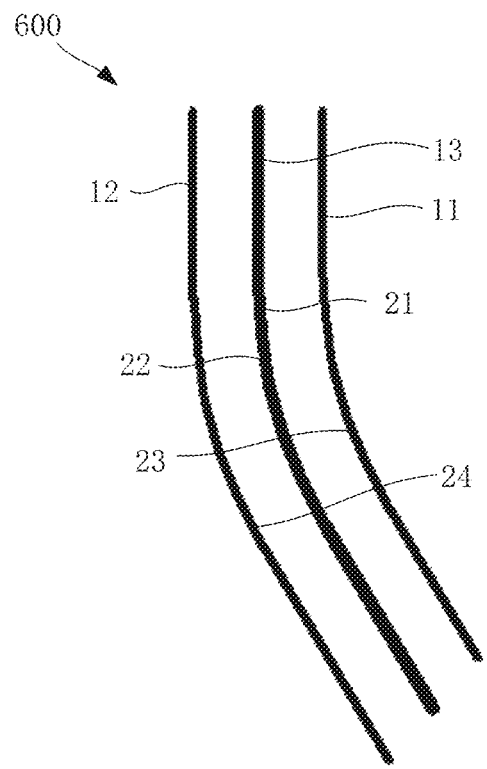
FIG. 13 is a schematic diagram of a trace structure at a third corner of a touch module according to an embodiment of the present application.

In some embodiments, referring to FIG. 13, the traces include a third corner 600. At the third corner 600, corresponding portions of the first side wall 21 and the third side wall 23 are arc-shaped with the same curvature; and corresponding portions of the second side wall 22 and the fourth side wall 24 are arc-shaped with the same curvature. At the third corner 600, the first side wall 21, the second side wall 22, the third side wall 23, and the fourth side wall 24 are configured into an arc-shaped structure to reduce or even eliminate the possibility of forming a tip, thereby preventing the first side wall 21 and the third side wall 23 from forming therebetween a protrusion that allows the two to get too close to each other, and preventing the second side wall 22 and the fourth side wall 24 from forming therebetween a protrusion that allows the two to get too close to each other. The third corner 600 does not specifically refer to a certain corner, but may be any corner that may be present at any oppositely disposed portions of the first and second traces 11 and 12. As an example, the third corner 600 may be a corner present at b in FIG. 3.

It should be noted that the traces further include a straight extension segment, at which the first trace 11, the second trace 12 and the shielding wire 13 may be conductor wires that have uniform width and extend along the same direction. The connection traces are configured to connect the touch region 100 with the bonding region 300 for transmitting electric signals; and the shielding wire 13 is configured to shield the first trace 11 from the second trace 12 and reduce or even eliminate the signal interferences between the first trace 11 and the second trace 12. Therefore, compared with changing the connection traces, the present application achieves the same purpose of evenly and equally space the shielding wire 13 and the connection traces by adjusting the structure of the shielding wire 13, which may reduce the impacts to the performances of the connection traces, and reduce or even eliminate the probability of silver migration occurring to the specific region (such as a corner) of the traces, without affecting the performance of the touch module.

In some embodiments, the side wall of the grounding wire 14 close to the second trace 12 and the side wall of the second trace 12 close to the grounding wire 14 are evenly and equally spaced. That is, along the extension direction of the traces, a space formed between the grounding wire 14 and the second trace 12 is even and equal in width. When the grounding wire 14 is grounded (or is connected with a metal housing or component of the display device), a voltage difference exists between the second trace 12 and the grounding wire 14. However, charges will not accumulate on the grounding wire 14, and there is no position with an overlarge voltage difference between the second trace 12 and the grounding wire 14. The side wall of the grounding wire 14 close to the second trace 12 and the side wall of the second trace 12 close to the grounding wire 14 are evenly and equally spaced to prevent any position with an undersized space from being formed therebetween. Although the voltage between the grounding wire 14 and the second trace 12 is not affected, the space between the two may be increased (compared with the case of the protrusion in the prior art), thereby reducing the probability of silver migration occurred between the second trace 12 and the grounding wire 14. Similar to the shielding wire 13, the grounding wire 14 is not responsible for transmitting signals. Therefore, the running direction and structure of the grounding wire 14 may be adjusted in such a way that the mutually adjacent side walls of the second trace 12 and the grounding wire 14 are evenly and equally spaced.

In some embodiments, the traces are made of an APC material. That is, the first trace 11, the second trace 12, the shielding wire 13 and the grounding wire 14 are all made of the APC material. The APC material is lower in sheet resistance and better in reliability.

In some embodiments, the touch module at least includes a substrate 31, a pattern layer 34, and an insulating protective layer 35, which are laminated in sequence. As an example, in some embodiments, referring to FIG. 14, the touch module includes the substrate 31, a hardened layer 32, a shadow elimination layer 33, the pattern layer 34, and the insulating protective layer 35; the traces are disposed inside a peripheral region corresponding to the pattern layer 34; and touch drive electrodes Tx and touch detection electrodes Rx are formed in a touch region corresponding to the pattern layer 34.

Figure 14:
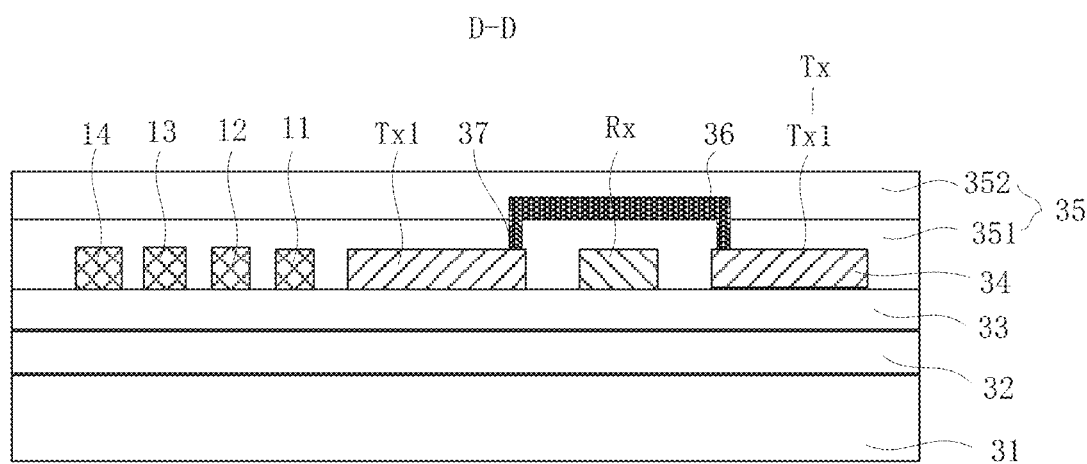
FIG. 14 is a sectional view taken along D-D in FIG. 3.

As an example, when the touch module is a mutual-capacitance type structure shown in FIG. 3, referring to FIG. 14, a portion of the pattern layer 34 in the touch region 300 includes the touch detection electrodes Rx and a plurality of touch drive electrode units Tx1; the insulating protective layer 35 includes a first insulating protective layer 351 and a second insulating protective layer 352, which are in a laminated arrangement. The touch module further includes a bridge wire layer 36 disposed between the first insulating protective layer 351 and the second insulating protective layer 352; and the bridge wire layer 36 includes a plurality of bridge wires, which electrically connect any two adjacent touch drive electrode units Tx1, arranged along a horizontal direction, through a via hole 37 to form the touch drive electrode Tx.

In another aspect, the present disclosure further provides a touch display screen, which includes a display module and the aforesaid touch module in a laminated arrangement. The touch module according to any one of the embodiments above and a combination of any multiple embodiments is used as the touch module. Based on the same reason as that regarding the aforesaid touch module, the reliability of the touch display screen may be improved.

In another aspect, the present application further provides a touch display device, which includes the aforesaid touch display screen. Based on the same reason as that regarding the aforesaid touch display screen, the reliability of the touch display device may be improved.

It should be noted that, based on the light-emitting patterns of the display devices, the display devices may include a liquid crystal display (LCD) device, a light-emitting diode (LED) device, an organic light-emitting diode (OLED) device, a quantum-dot light-emitting diode (QLED) devices, a plasma display panel (PDP), etc.

The specific features, structures, materials or characteristics described in the specification may be combined in any one or more embodiments or examples in an appropriate manner.

Described above are merely specific embodiments of the present disclosure, however, the protection scope of the present application is not limited thereto. Any variations or substitutions that are easily conceivable for a person skilled in the art within the technical scope of the present application should be included within the protection scope of the present application. Therefore, the protection scope of the present disclosure should be subject to the protection scope of the claims as described.

The invention claimed is:

1. A touch module, comprising a touch region, a peripheral region, and a bonding region, wherein the peripheral region comprises a plurality of traces, the traces comprise:
   connection traces configured to electrically connect the touch region with the bonding region, wherein the connection traces comprise a first trace and a second trace that are disposed at interval;
   a shielding wire disposed between the first trace and the second trace, wherein a side wall of the shielding wire close to the first trace is a first side wall, a side wall of the shielding wire close to the second trace is a second side wall, a side wall of the first trace close to the shielding wire is a third side wall, and a side wall of the second trace close to the shielding wire is a fourth side wall, the first side wall and the third side wall are evenly and equally spaced therebetween, and the second side wall and the fourth side wall are evenly and equally spaced therebetween; and
   a grounding wire disposed at sides of the connection traces away from the touch region; and
   the traces comprise a first corner, at which the fourth side wall comprises a first extension segment and a second extension segment that is disposed at an obtuse angle with respect to the first extension segment.

2. The touch module according to claim 1, wherein the second extension segment inclines towards a side close to the shielding wire, and one end of the shielding wire extends beyond an end of the first extension segment close to the second extension segment, an end of the shielding wire is provided with an avoidance chamfer on a side close to the second extension segment, a side wall of the avoidance chamfer close to the second extension segment is a first side sub-wall which is in parallel with the second extension segment, and a distance between the first side sub-wall and the second extension segment is equal to a distance between the second side wall and the first extension segment.

3. The touch module according to claim 1, wherein the traces comprise a first corner, at which the fourth side wall comprises a first extension segment and a second extension segment that is disposed at an obtuse angle with respect to the first extension segment, and the second extension segment inclines towards a side close to the shielding wire; and
   one end of the shielding wire is flush with an end of the first extension segment close to the second extension segment.

4. The touch module according to claim 1, wherein the traces comprise a second corner, at which, the third side wall comprises a plurality of third side wall subsegments, the first side wall comprises a plurality of first side wall segments in parallel with the third side wall subsegments in one-to-one correspondence, and a space between any corresponding pair of the third side wall subsegment and the first side wall segment is equal; and
   the fourth side wall comprises a plurality of fourth side wall subsegments, the second side wall comprises a plurality of second side wall segments in parallel with the fourth side wall subsegments in one-to-one correspondence, and a space between any corresponding pair of the fourth side wall subsegment and the second side wall segment is equal.

5. The touch module according to claim 1, wherein the traces comprise a third corner, at which corresponding portions of the first side wall and the third side wall are arc-shaped with the same curvature, and corresponding portions of the second side wall and the fourth side wall are arc-shaped with the same curvature.

6. The touch module according to claim 1, wherein a side wall of the grounding wire close to the second trace and a side wall of the second trace close to the grounding wire are evenly and equally spaced therebetween.

7. The touch module according to claim 1, wherein the traces are made of an APC material.

8. The touch module according to claim 1, wherein the touch module comprises a substrate, a pattern layer and an insulating protective layer in a laminated arrangement, the pattern layer is disposed at one side of the substrate, wherein the traces are disposed within the pattern layer; and
   the insulating protective layer is disposed on a side of the pattern layer away from the substrate.

9. A touch display screen, comprising a display module and the touch module according to claim 1, wherein the display module and the touch module are in a laminated arrangement.

10. The touch display screen according to claim 9, wherein the traces comprise a first corner, at which the fourth side wall comprises a first extension segment and a second extension segment that is disposed at an obtuse angle with respect to the first extension segment.

11. The touch display screen according to claim 9, wherein the traces comprise the second extension segment inclines towards a side close to the shielding wire, and one end of the shielding wire extends beyond an end of the first extension segment close to the second extension segment, an end of the shielding wire is provided with an avoidance chamfer on a side close to the second extension segment, a side wall of the avoidance chamfer close to the second extension segment is a first side sub-wall which is in parallel with the second extension segment, and a distance between the first side sub-wall and the second extension segment is equal to a distance between the second side wall and the first extension segment.

12. The touch display screen according to claim 9, wherein the traces comprise a first corner, at which the fourth side wall comprises a first extension segment and a second extension segment that is disposed at an obtuse angle with respect to the first extension segment, and the second extension segment inclines towards a side close to the shielding wire; and
one end of the shielding wire is flush with an end of the first extension segment close to the second extension segment.

13. The touch display screen according to claim 9, wherein the traces comprise a second corner, at which,
the third side wall comprises a plurality of third side wall subsegments, the first side wall comprises a plurality of first side wall segments in parallel with the third side wall subsegments in one-to-one correspondence, and a space between any corresponding pair of the third side wall subsegment and the first side wall segment is equal; and
the fourth side wall comprises a plurality of fourth side wall subsegments, the second side wall comprises a plurality of second side wall segments in parallel with the fourth side wall subsegments in one-to-one correspondence, and a space between any corresponding pair of the fourth side wall subsegment and the second side wall segment is equal.

14. The touch display screen according to claim 9, wherein the traces comprise a third corner, at which corresponding portions of the first side wall and the third side wall are arc-shaped with the same curvature, and corresponding portions of the second side wall and the fourth side wall are arc-shaped with the same curvature.

15. The touch display screen according to claim 9, wherein the traces comprise a side wall of the grounding wire close to the second trace and a side wall of the second trace close to the grounding wire are evenly and equally spaced therebetween.

16. The touch display screen according to claim 9, wherein the traces are made of an APC material.

17. The touch display screen according to claim 9, wherein the touch module comprises a substrate, a pattern layer and an insulating protective layer in a laminated arrangement:
the pattern layer disposed at one side of the substrate, wherein the traces are disposed within the pattern layer; and
the insulating protective layer disposed on a side of the pattern layer away from the substrate.

18. A display device, comprising the touch display screen according to claim 9.

* * * * *